(12) United States Patent
Okuhira et al.

(10) Patent No.: US 6,476,160 B1
(45) Date of Patent: *Nov. 5, 2002

(54) ONE-PACK COMPOSITION OF EPOXY RESIN(S) WITH NO OH GROUPS AND KETIMINE

(75) Inventors: Hiroyuki Okuhira, Kanagawa (JP); Naoya Adachi, Kanagawa (JP)

(73) Assignee: The Yokohama Rubber Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,057

(22) Filed: Jul. 16, 1999

(30) Foreign Application Priority Data

Jul. 16, 1998 (JP) ............................................ 10-202082
Jul. 17, 1998 (JP) ............................................ 10-204026
Jul. 17, 1998 (JP) ............................................ 10-204027

(51) Int. Cl.$^7$ ........................ C08L 63/02; C08G 59/16; C08G 59/50

(52) U.S. Cl. ........................ 525/524; 525/526; 525/528; 525/476; 528/121; 528/122; 528/123; 528/124

(58) Field of Search ........................ 522/103; 525/524, 525/526, 528, 476; 528/121, 122, 123, 124

(56) References Cited

U.S. PATENT DOCUMENTS

| | | | | |
|---|---|---|---|---|
| 2,633,458 A | * | 3/1953 | Shokal | |
| 3,291,775 A | * | 12/1966 | Holm | |
| 4,177,174 A | * | 12/1979 | Hayashi et al. | |
| 4,391,958 A | * | 7/1983 | Minato et al. | |
| 4,582,889 A | * | 4/1986 | Yamaguchi et al. | |
| 5,684,094 A | * | 11/1997 | Suzuki et al. | |
| 5,789,520 A | * | 8/1998 | Karasawa et al. | |
| 5,889,124 A | * | 3/1999 | Ando et al. | |
| 6,045,873 A | * | 4/2000 | Adachi et al. | |

FOREIGN PATENT DOCUMENTS

| | | | |
|---|---|---|---|
| JP | 60-78672 | * | 5/1985 |
| JP | 60-215075 | * | 10/1985 |
| JP | 63-273629 | * | 11/1988 |
| JP | 63-273630 | * | 11/1988 |
| JP | 3-195724 | * | 9/1991 |
| JP | 5-132541 | * | 5/1993 |
| JP | 4-188634 | * | 7/1995 |
| JP | 10-60095 | | 3/1998 |
| JP | 60-60227 | | 3/1998 |
| JP | 10-101903 | | 4/1998 |
| JP | 10-158625 | | 6/1998 |
| JP | 11-131823 | | 5/1999 |
| PL | 14472 | | 6/1988 |
| WO | WO 98/31722 | | 7/1998 |

OTHER PUBLICATIONS

Lee and Neville's Handbook of Epoxy Resins, McGraw–Hill Book Company, New York, New York (1967), p. 6–40.*

Lee and Neville's Handbook of Epoxy Resins, McGraw–Hill Book Company, New York, New York, 1967, p. 4–60.*

* cited by examiner

Primary Examiner—Robert E. L. Sellers
(74) Attorney, Agent, or Firm—Finnegan, Henderson, Farabow, Garrett & Dunner LLP

(57) ABSTRACT

A composition comprising an epoxy resin and a ketimine compound, wherein the epoxy resin is either (1) an epoxy resin having a content of an epoxy resin having no hydroxyl group in the molecule in a range of more than 90 mol % to 100 mol % or less, (2) an epoxy resin wherein hydroxyl groups are capped with an isocyanate group-containing compound, (3) an epoxy resin wherein hydroxyl groups are capped with an alkoxysilyl group-containing compound, or (4) an epoxy resin containing an alkoxysilyl group-containing compound which is capable of capping hydroxyl groups of the epoxy resin. When either of the those epoxy resins is used and also the ketimine compound having high steric hindrance is used, a one-pack epoxy resin composition having good curing property and particularly excellent storage stability can be provided.

2 Claims, No Drawings

ONE-PACK COMPOSITION OF EPOXY RESIN(S) WITH NO OH GROUPS AND KETIMINE

BACKGROUND OF THE INVENTION

The present invention generally relates to a one-pack epoxy resin composition. Specifically, the present invention is directed to a one-pack epoxy resin composition having good storage stability and excellent curing property. More specifically, the present invention is directed to a one-pack epoxy resin composition that is useful as adhesives, paints, coating materials and the like in civil engineering and building construction fields, for having the good storage stability and the excellent curing property.

Conventionally, epoxy resins have been widely used as adhesives, sealing materials or paints in the fields of civil engineering, building construction, electronic equipment, and the like, for having excellent characteristics in adhesion, strength, and the like.

Epoxy resins have high reactivity. Therefore, when epoxy resins are mixed with an amine component, those easily react with the amine component and cure. For this reason, a two-pack epoxy resin composition comprising an epoxy resin as the main material and an amine curing agent which are separately packaged has conventionally been a main stream. A curing accelerator such as phenol or a tertiary amine is compounded with this two-pack epoxy resin composition in order to shorten a curing time, and such a blend is put into practical use. On the other hand, various investigations have been made on a one-pack epoxy resin composition using a latent curing agent mainly consisting of a ketimine compound. For example, a technique for improving the storage stability by using a ketimine compound having a larger steric hindrance is proposed. However, there is no satisfactory technique from the standpoints of the storage stability and the curing property, and any technique has not yet been put into practical use.

For example, Japanese Patent Application Laid-open No. Hei 5-132541 (hereinafter, referred to as "JP-A") discloses a technique in which reactivity during storage is decreased by making a skeleton of a ketimine compound be a long chain polyoxylene, resulting in increasing the storage stability. However, a curing rate upon being taken out of a vessel is slow, thereby being not yet put into practical use.

On the other hand, there is proposed a technique of using a latent curing agent having a steric hindrance in which amine or thiol is capped with a trialkylsilyl group (JP-A-1-138221, JP-A-2-36220, etc.). However, since such a curing agent susceptibly reacts with even a slight amount of water, there arises such a disadvantage that the curing agent is gelled by a slight amount of water existing in a system during storage.

SUMMARY OF THE INVENTION

Accordingly, an object of the present invention is to provide a one-pack epoxy resin composition having good storage stability and excellent curing property.

Another object of the present invention is to provide a one-pack epoxy resin composition having high curing rate upon being taken out of a vessel, and excellent storage stability.

The inventors of the present invention have found that in case of using a ketimine compound as a latent curing agent, the storage stability of a one-pack epoxy resin composition is improved by capping the whole or a part of hydroxyl groups existing in general-purpose epoxy resins, or by using an epoxy resin having no hydroxyl group at all in the molecule. The present invention has been completed based on this finding.

Also, the inventors of the present invention have found that in case of using a ketimine compound as a latent curing agent, the storage stability and curing property of a one-pack epoxy resin composition are improved by using an epoxy resin which has or does not have an isocyanate group, obtained by reacting a polyisocyanate compound having an isocyanate group having a larger steric hindrance with the whole or a part of hydroxyl groups existing in general-purpose epoxy resins, thereby capping the whole or a part of hydroxyl groups, and a ketimine compound having a larger steric hindrance. The present invention has been completed based on this finding.

Further, the present inventors have found that in case of using a ketimine compound as a latent curing agent, the storage stability and curing property of a one-pack epoxy resin composition are improved by reacting an alkoxysilyl group-containing compound with the whole or a part of hydroxyl groups existing in general-purpose epoxy resins, thereby capping the whole or a part of hydroxyl groups, or by using together an epoxy resin having at least two epoxy groups in the molecule, and an alkoxysilyl group-containing compound. The present invention has been completed based on this finding.

Accordingly, a first aspect of the present invention is a one-pack epoxy resin composition comprising an epoxy resin in which a content of an epoxy resin having no hydroxyl group in the molecule is in a range of from more than 90 mol % to 100 mol % or less, and a ketimine compound.

In one preferred first embodiment of the one-pack epoxy resin composition, the epoxy resin is such that hydroxyl groups of an epoxy resin having hydroxyl groups in the molecule are capped with an isocyanate group-containing compound, and the isocyanate group does not remain.

In an another preferred first embodiment of the one-pack epoxy resin composition, the epoxy resin is such that hydroxyl groups of an epoxy resin having hydroxyl groups in the molecule are capped with an isocyanate group-containing compound, and at least one isocyanate group remains in the total epoxy resins.

In a still another preferred first embodiment of the one-pack epoxy resin composition, the hydroxyl groups do not remain in the molecule of the epoxy resin containing an epoxy resin having an isocyanate group in the molecule.

In the case that the isocyanate group does not remain after reacting the isocyanate group-containing compound with hydroxyl groups of the epoxy resin, the isocyanate group-containing compound is preferably represented by the following formula (1):

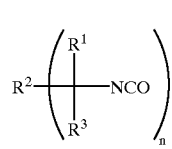

$R^1$: an organic group (including an organic group containing O, S or N)

$R^2$: an organic group (including an organic group containing O, S or N)

R³: hydrogen atom or an organic group (including an organic group containing O, S or N)

n: an integer of 1 to 100, more preferably,

R¹: a hydrocarbon group having 1 to 5 carbon atoms

R²: a hydrocarbon group having 1 to 20 carbon atoms (including a hydrocarbon group containing O or N)

R³: hydrogen atom or a hydrocarbon group having 1 to 5 carbon atoms

In the case that the isocyanate group remains after reacting the isocyanate group-containing compound with hydroxyl groups of the epoxy resin, the polyisocyanate group-containing compound is preferably represented by the following formula (2):

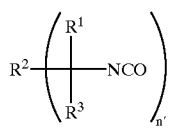

(2)

R¹: an organic group (including an organic group containing O, S or N)

R²: an organic group (including an organic group containing O, S or N)

R³: hydrogen atom or an organic group (including an organic group containing O, S or N)

n': an integer of 2 to 100, more preferably,

R¹: a hydrocarbon group having 1 to 5 carbon atoms

R²: a hydrocarbon group having 1 to 20 carbon atoms (including a hydrocarbon group containing O or N)

R³: hydrogen atom or a hydrocarbon group having 1 to 5 carbon atoms

It is also preferable to conduct the reaction between hydroxyl groups of the epoxy resin having hydroxyl groups in the molecule and the isocyanate group-containing compound in the presence of a condensation catalyst.

A second embodiment of the present invention is a one-pack epoxy resin composition comprising an epoxy resin, an alkoxysilyl group-containing compound which is capable of capping hydroxyl groups in the molecule of the epoxy resin, thereby making a content of an epoxy resin having no hydroxyl group in the molecule to a range from more than 90 mol % to 100 mol % or less, and a ketimine compound.

The present invention includes a one-pack epoxy resin composition wherein the epoxy resin is such that hydroxyl groups of an epoxy resin having hydroxyl groups in the molecule are capped with the alkoxysilyl group-containing compound.

It is also preferable to conduct the reaction between hydroxyl groups of the epoxy resin having hydroxyl groups in the molecule and the alkoxysilyl group-containing compound in the presence of a condensation catalyst.

Further, it is preferable that the ketimine compound in the first and second embodiments of the present invention is a ketimine compound obtained by reacting a ketone having a substituent at α-position, with a polyamine having at least two amino groups in the molecule.

The ketone is preferably a compound represented by the following formula (3):

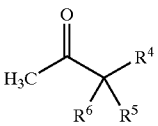

(3)

R⁴: an alkyl group having 1 to 6 carbon atoms

R⁵: methyl group or ethyl group

R⁶: hydrogen atom, methyl group or ethyl group

Also, the polyamine is preferably a compound represented by the following formula (4):

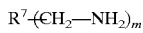

(4)

R⁷: an organic group (including an organic group containing O, S or N)

m: an integer of 2 to 100

DETAILED DESCRIPTION OF THE INVENTION

The present invention is described in detail below.

The one-pack epoxy resin composition of the present invention (hereinafter referred to as "composition of the present invention" for simplicity) is an epoxy resin composition comprising an epoxy resin and a ketimine compound. More specifically, the composition of the present invention comprises an epoxy resin wherein a content of an epoxy resin having no hydroxyl group in the molecule is in a range of from more than 90 mol % to 100 mol % of less, and a ketimine compound. In other words, the composition of the present invention comprises an epoxy resin which comprises less than 10 mol % of an epoxy resin having hydroxyl groups in the molecule and 90 mol % or more of an epoxy resin having no hydroxyl group in the molecule, and a ketimine compound. The composition like this makes it possible to greatly improve the storage stability as compared with that of the conventional one-pack epoxy resin composition, without deterioration of curing property.

The general-purpose bisphenol A-epichlorohydrin type epoxy resin has intramolecular hydroxyl groups in an amount of about 10 mol %, but the epoxy resin of the present invention has less content of the intramolecular hydroxyl groups than the general-purpose resins.

Such an epoxy resin is obtained by distilling a general-purpose epoxy resin. Also the epoxy resin is produced by reacting the whole or a part of the intramolecular hydroxyl groups with an isocyanate group-containing compound, preferably a polyisocyanate compound, thereby capping hydroxyl groups to form an urethane bond. In this urethane formation reaction, if a monoisocyanate group-containing compound is used in an amount smaller than the equivalent number of hydroxyl groups, the isocyanate group does not remain in the epoxy resin after reaction. On the other hand, if a polyisocyanate compound containing a plurality of isocyanate groups is used, unreacted isocyanate groups are present, and as a result, isocyanate groups remain in the epoxy resin after reaction. In this case, it is sufficient that at least one isocyanate group remains in the total epoxy resins. Therefore, in the present invention, an epoxy resin having an isocyanate group in the molecule, an epoxy resin having hydroxyl groups, an epoxy resin having no hydroxyl group and isocyanate group, an isocyanate group-containing compound having unreacted isocyanate group, and the like are contained in the epoxy resin constituting the composition together with the ketimine compound.

In the epoxy resin of the present invention, the content of the epoxy resin having no hydroxyl group in the molecule is in a range from more than 90 mol % to 100 mol % or less, preferably more than 92 mol % to 100 mol % or less, and more preferably more than 95 mol % to 100 mol % or less. In other words, the content of the epoxy resin having hydroxyl groups is less than 10 mol %, preferably 0 to 8 mol %, and more preferably 0 to 5 mol %, in the total epoxy resins.

The epoxy resin which constitutes the composition of the present invention contains the epoxy resin having hydroxyl groups in the molecule in an amount of less than 10 mol %, preferably 0 to 8 mol %, and more preferably 0 to 5 mol %, of the total epoxy resins, and the epoxy resin which does not have hydroxyl groups in the molecule in an amount in a range of from more than 90 mol % to 100 mol % or less, preferably more than 92 mol % to 100 mol % or less, and more preferably more than 95 mol % or more to 100 mol % or less, of the total epoxy resins.

The epoxy resin used in the present invention is classified into the following two epoxy resins.

(1) An epoxy resin wherein the total amount of an epoxy resin which does not originally have hydroxyl groups in the molecule and an epoxy resin in which hydroxyl groups are capped by the reaction of hydroxyl groups of the epoxy resin having hydroxyl groups in the molecule with a capping compound, thus the hydroxyl groups being modified, is more than 90 mol % of the total epoxy resins, and the content of the epoxy resin having hydroxyl groups in the molecule is less than 10 mol % of the total epoxy resins.

(2) An epoxy resin which consists of only the epoxy resin which does not originally have hydroxyl groups in the molecule, and thus does not contain the epoxy resin having hydroxyl groups in the molecule.

The epoxy resin which does not originally have hydroxyl groups in the molecule is obtained by using specific raw materials and production process, and examples thereof are DER332 (a product of Dow Chemical Co.), and the like which are commercially available.

The raw material epoxy resin for the epoxy resin compounded with the composition of the present invention or the epoxy resin compounded with the composition of the second embodiment of the present invention has at least two epoxy groups in one molecule.

Examples of the above-mentioned epoxy resin include bisphenol A-glycidyl ether type epoxy resin and its derivatives, glycerin-glycidyl ether type epoxy resin, polyalkylene oxide-glycidyl ether type epoxy resin, phenol novolac-glycidyl ether type epoxy resin, dimer acid-glycidyl ester type epoxy resin, bisphenol F-glycidyl ether type epoxy resin, and an epoxy resin having sulfur atom in the main chain, such as FLEP 10, a product of Toray Thiocol Co. Of those, bisphenol A-glycidyl ether type epoxy resin is easily available and is suitably used. Further, if an epoxy resin having sulfur atom in the main chain is used, adhesiveness to a wet surface of the composition of the present invention is excellent, which is preferable.

The epoxy resin used in the present invention contains an epoxy resin wherein the intramolecular hydroxyl groups are bonded to functional groups of other compound to cap the same. Suitable examples of the capping agent having functional group reactive to hydroxyl groups are an isocyanate group-containing compound and an alkoxysilyl group-containing compound. A polyisocyanate compound is particularly preferable. The whole or a part of the intramolecular hydroxyl groups of the epoxy resin is capped by the above-described reaction, thereby decreasing the content.

It is possible to remain or not remain the isocyanate group in the epoxy resin depending on the type of the isocyanate group-containing compound, compositional ratio to hydroxyl group, and the like.

If hydroxyl groups of the epoxy resin are reacted with isocyanate groups of the isocyanate group-containing compound to cap those and an isocyanate group does not remain, the composition of the present invention obtained has excellent storage stability. In particular, if hydroxyl groups in the epoxy resin react with an isocyanate group-containing compound having at least one isocyanate group having large steric hindrance as shown in the formula (1) above to cap those, this enable the composition of the present invention obtained to have further excellent storage stability.

Where an isocyanate group is intended not to remain, the compounding ratio of the epoxy resin and the isocyanate group-containing compound is preferably 1:1 to 1:10, and more preferably 1:1, in an equivalent ratio of hydroxyl groups contained in the total epoxy resins and isocyanate groups in the isocyanate group-containing compound (hydroxyl group/isocyanate group) By making this proportion, hydroxyl groups in the epoxy resin are capped, and as a result, the composition which does not contain an isocyanate group in the epoxy resin is obtained, so that the storage stability of the composition is improved.

Further, by reacting hydroxyl groups in the epoxy resin with isocyanate groups in the isocyanate group-containing compound to cap those such that at least one isocyanate group remains in the total epoxy resins, the storage stability and curing property of the composition of the present invention obtained are greatly improved.

This corresponds to the content of the isocyanate group-containing epoxy resin being 0.5 mol % or more, and preferably 5 to 10 mol %, of the total epoxy resins. In the case that the isocyanate group is intended to remain, the equivalent ratio of hydroxyl group/isocyanate group should be at least 1.

Further, the compounding ratio of the epoxy resin and the polyisocyanate compound is preferably OH/NCO<1, and more preferably 0.5 to 1, in the equivalent ratio of hydroxyl groups contained in the total epoxy resins and isocyanate groups in the polyisocyanate compound.

Within this range, all hydroxyl groups contained in the epoxy resin react with the above-described polyisocyanate compound, thereby forming an epoxy resin having no hydroxyl group in the total epoxy resins. By using the epoxy resin wherein the whole of hydroxyl groups in the epoxy resin are bonded to the polyisocyanate compound, thereby hydroxyl groups in the epoxy resin are all capped, the composition of the present invention obtained has further improved curing property.

Example of a method for reacting hydroxyl groups in the epoxy resin with the isocyanate group-containing compound includes a method of compounding the epoxy resin and the isocyanate group-containing compound in the above-described proportion, and reacting the resulting mixture at 50 to 80° C. for 1 to 10 hours under heating, preferably in the presence of a condensation catalyst such as dibutyltin dilaurate. This reaction may previously conducted before compounding the epoxy resin , the isocyanate group-containing compound and other component, or may be conducted during compounding those. If there action is conducted before compounding, hydroxyl groups in the epoxy resin can securely be capped.

Examples of the condensation catalyst include tin or titanium type general-purpose metal catalysts, for example, alkyl titanates; organosilicon titanates; metal salts of carboxylic acid, such as tin octylate, tin dibutylate laurate or tin dibutylate maleate; and bismuth type general-purpose metal catalysts such as NEOSTAN B17 (a product of Nitto Chemical Co.).

The amount of the condensation catalyst used is preferably 0.01 to 5 parts by weight per 100 parts by weight of the epoxy resin.

The isocyanate group-containing compound used in the present invention is not particularly limited, and monoisocyanate compounds and polyisocyanate compounds can be used. Further, urethane prepolymers having an isocyanate group can also be used. The urethane prepolymer is a reaction product of a monomer of the above-described isocyanate group-containing compound, and a polyol generally used in the synthesis of urethane prepolymers.

Examples of the monoisocyanate compound include ethyl isocyanate and phenyl isocyanate. Examples of the polyisocyanate compound include 2,4-tolylenediisocyanate, 4,4'-diphenylmethane diisocyanate, hexamethylenediisocyanate, isophoronediisocyanate and xylilenediisocyanate. Further, an urethane prepolymer synthesized from the above-described polyisocyanate and polyol can be used as the urethane prepolymer having an isocyanate group.

Of those isocyanate group-containing compounds, it is preferable to use an isocyanate group-containing compound having at least one isocyanate group having large steric hindrance in one molecule, represented by the following formula (1):

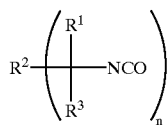

(1)

wherein $R^1$ and $R^2$, which may be the same or different, represent an alkyl group having 1 to 6 carbon atoms, alkenyl group having 2 to 6 carbon atoms, aryl group having 6 to 10 carbon atoms, arylalkyl group having 8 to 16 carbon atoms, a hydrocarbon group may contain ether bond, ester bond, amide bond, urea bond, urethane bond and the like, and epoxy group, or a combination thereof; $R^3$ represents the above-described organic group or hydrogen atom; and n is an integer of 1 or more.

The polyisocyanate compounds are a compound having at least two isocyanate groups in the molecule. Of those, a polyisocyanate compound represented by the following formula (2) is preferable. Such a polyisocyanate compound may be a monomer or an urethane prepolymer having at least two isocyanate groups. It is particularly preferable to use a monomer or an urethane prepolymer, having at least two isocyanate groups having large steric hindrance, represented by the following formula (2):

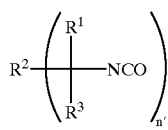

(2)

wherein $R^1$ and $R^2$, which may be the same or different, represent an alkyl group having 1 to 6 carbon atoms, alkenyl group having 2 to 6 carbon atoms, aryl group having 6 to 10 carbon atoms, arylalkyl group having 8 to 16 carbon atoms, a hydrocarbon group may contain ether bond, ester bond, amide bond, urea bond, urethane bond and the like, and epoxy group, or a combination thereof; $R^3$ represents the above-described organic group or hydrogen atom; and n' is an integer of 2 or more.

Specifically, commercially available products such as TMI (monoisocyanate compound), TMXDI (diisocyanate compound) or SCISEN (triisocyanate compound), products of Mitsui Scitec Co., can suitably be used as the isocyanate group-containing monomer and the polyisocyanate compound.

Examples of the polyol compound which forms the urethane prepolymer include polyether polyols obtained by adding at least one of propylene oxide, ethylene oxide and the like to at least one polyhydric alcohol such as ethylene glycol, glycerin, 1,1,1-trimethylol propane, 1,3-butanediol or pentaerythritol; polyester polyols such as condensation polymers of at least one of ethylene glycol, glycerin, 1,1,1-trimethylol propane or other low molecular weight polyol and at least one of glutaric acid, adipic acid, other low molecular weight carboxylic acid or oligomeric acid, or ring-opening polymer such as propionlactone; and low molecular weight polyols such as ethylene glycol, diethylene glycol, polycarbonate polyol or hydrogenated polybutadiene polyol.

To obtain an urethane prepolymer comprising such a polyol compound and the above-described isocyanate group-containing compound, the method as obtaining conventional urethane prepolymers is used, comprising mixing the polyol compound and the isocyanate group-containing compound in the compounding ratio of preferably 1.2 to 5 equivalents, and more preferably 1.5 to 3 equivalents, per equivalent of the polyol compound, and stirring under heating the resulting mixture at generally 30 to 120° C., and preferably 50 to 100° C.

Where the urethane prepolymer is used as the polyisocyanate compound represented by the above-mentioned formula (2) which is used in the composition of the present invention, the urethane prepolymer used is preferably a reaction product of a monomer having an isocyanate group having large steric hindrance, represented by the above-mentioned formula (2), and a polyol compound.

Polyols as exemplified above can be used as the polyol compound for forming such an urethane prepolymer.

To obtain the urethane prepolymer comprising such a polyol compound and the above-described polyisocyanate compound, the method as obtaining conventional urethane prepolymers is used, comprising mixing the polyol compound and the polyisocyanate compound in the compounding ratio of preferably 1.2 to 2.0 equivalents (NCO equivalent), and more preferably 1.5 to 2.0 equivalents, per equivalent of the polyol compound (OH equivalent), and stirring under heating the resulting mixture at generally 50 to 80° C. In this method, a metal catalyst such as tin, bismuth or titanium may be used.

The polyisocyanate compound represented by the above-mentioned formula (2) has at least one substituent at α-position of the isocyanate group, and is a compound having large steric hindrance of the isocyanate group. Since the epoxy resin used in the present invention has the isocyanate group therein, the composition of the present invention obtained has excellent curing property and also good storage stability.

Example of the other compound that reacts with hydroxyl groups of the epoxy resin having hydroxyl groups in the molecule to thereby cap the hydroxyl groups includes an alkoxysilyl group-containing compound.

The alkoxysilyl group-containing compound reacted with hydroxyl groups is not particularly limited so long as it is a compound having an alkoxysilyl group, and may be a monomer or a polymer. An alkoxysilyl group-containing compound represented by the following formula (5) can be used as such a compound:

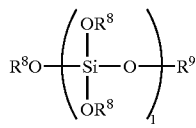
(5)

wherein $R^8$, which may be the same or different, represents an alkyl group having 1 to 6 carbon atoms, $R^9$ represents an alkyl group having 1 to 6 carbon atoms or an alkenyl group having 2 to 6 carbon atoms, and 1 is an integer of 1 to 50.

The storage stability of the composition of the present invention can be made excellent by condensation reacting hydroxyl groups in the epoxy resin with alkoxysilyl groups in the above-described alkoxysilyl group-containing compound to cap hydroxyl groups. In particular, the bond formed by the condensation reaction of hydroxyl groups and alkoxysilyl group has further lower reactivity than the urethane bond formed by the reaction of the hydroxyl groups and the isocyanate group having large steric hindrance, because it does not contain nitrogen, so that the storage stability of the composition of the present invention obtained is particularly excellent.

The compounding ratio of the alkoxysilyl group-containing compound and the epoxy resin is preferably that the alkoxysilyl group/hydroxyl group ratio is 1 to 50 in the equivalent ratio of hydroxyl groups contained in the total epoxy resins to alkoxysilyl groups contained in the alkoxysilyl group-containing compound. By making the ratio as above, the epoxy resin having no hydroxyl group in all resins is obtained. The ratio is more preferably 1 to 10.

Example of the method of reacting hydroxyl groups in the epoxy resin with the alkoxysilyl group-containing compound includes a method of compounding the epoxy resin and the alkoxysilyl group-containing compound in the above-mentioned ratio, and stirring under heating at from room temperature to 100° C. for from 2 to 24 hours, preferably in the presence of a condensation catalyst, while removing an alcohol produced under reduced pressure. This reaction may be conducted before compounding the epoxy resin, the alkoxysilyl group-containing compound and other component, or may be conducted during compounding. If the reaction is conducted before compounding, hydroxyl groups in the epoxy resin can securely be capped.

Examples of the condensation catalyst include tin or titanium type general-purpose metal catalysts, for example, alkyl titanates; organosilicon titanates; metal salts of carboxylic acid, such as tin octylate, tin dibutylate laurate or tin dibutylate maleate; and bismuth type general-purpose metal catalysts such as NEOSTAN B17 (a product of Nitto Chemical Co.).

The amount of the condensation catalyst used is preferably 0.01 to 5 parts by weight per 100 parts by weight of the epoxy resin.

The present invention includes a one-pack epoxy resin composition produced by simply mixing without previously reacting the alkoxysilyl group-containing compound with hydroxyl groups of the epoxy resin. In this case, however, the alkoxysilyl group-containing compound is a compound having at least one, and preferably 1 to 50, alkoxysilyl group in the molecule, and which does not have reactive substituent other than alkoxysilyl group. In other words, the alkoxysilyl group-containing compound used in the present invention is general alkoxysilyl group-containing compounds excluding a silane coupling agent.

Examples of the alkoxysilyl group-containing compound include a monomer represented by the following formula (6):

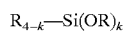
(6)

wherein R represents an organic group excluding a reactive substituent, which is a hydrocarbon group having 1 to 6 carbon atoms, and k is an integer of 1 to 3; and a polymer having at least four alkoxysilyl groups in one molecule and not having a reactive substituent.

In the alkoxysilyl group-containing compound represented by the formula (6), specific examples of R include the following organic groups.

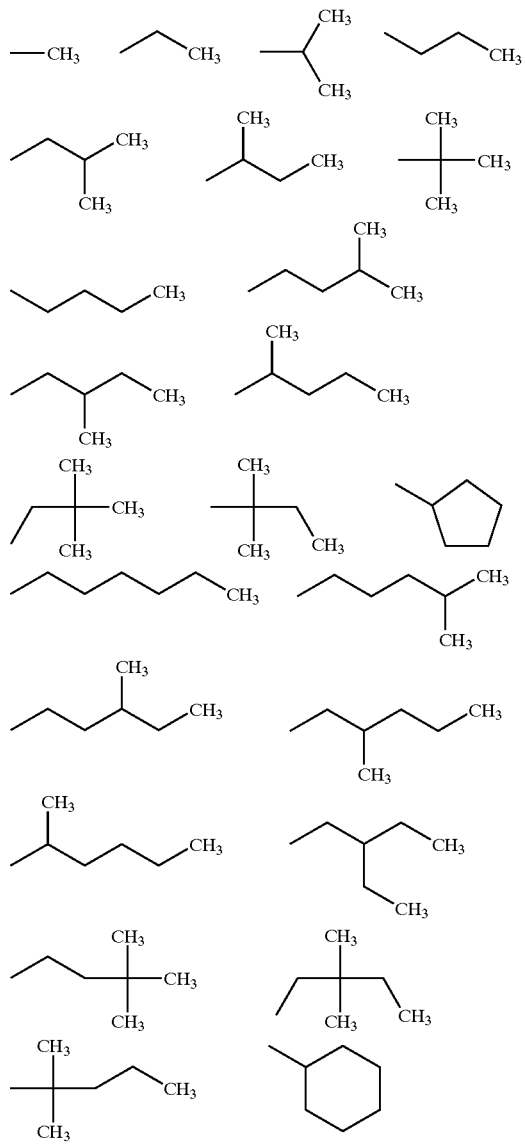

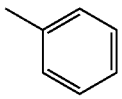

If the monomer represented by the formula (6) has at least two R and OR, respectively, those each may be the same or different. Examples of the reactive substituent excluded from R include vinyl group, methacryl group, epoxy group, amino group and mercapto group.

Specific example of the alkoxysilyl group-containing compound represented by the formula (6) is a compound represented by the following formula:

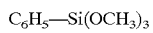

The polymer having at least four alkoxysilyl groups and having no reactive substituent in the molecule, used in the present invention may contain at least four alkoxyl groups either in the main chain, at the terminals of the main chain or in the side chain. The main chain mainly comprises Si-O bond, and where the alkoxysilyl group is contained in the main chain, Si in the alkoxysilyl group becomes Si in the main chain.

Alkoxyl group can be represented by —OR wherein R is the same as defined in the formula (6). The alkoxyl group (—OR) contained in one molecule may be the same or different. Si atom in the main chain can have substituent(s) other than alkoxyl group, but those substituents (functional group) should not be a reactive substituent. Examples of the group other than alkoxyl group, which can be present in the molecule include straight-chain alkyl groups such as methyl group, ethyl group or propyl group; branched alkyl groups such as isopropyl group or isobutyl group; cycloalkyl groups such as cyclohexamethyl group; and aromatic groups such as phenyl group or benzyl group. Examples of the reactive substituent to be excluded are the same reactive substituents which are excluded from the definition of R in the formula (6).

Specific example of the alkoxysilyl group-containing compound is MS51, a product of Mitsubishi Chemical Corp., represented by the following formula (7):

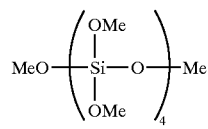

(7)

The above-described alkoxysilyl group-containing compound has the effect as a dehydrating agent, and the composition of the present invention containing such an alkoxysilyl group-containing compound has excellent storage stability without deterioration of excellent curing property due to the ketimine group-containing compound. Simultaneously, the alkoxysilyl group-containing compound brings about a diluting effect to the composition of the present invention, and in combination with the effect as a dehydrating agent as described above, the storage stability of the composition of the present invention can be improved.

In the composition of the present invention, the content of the alkoxysilyl group-containing compound is preferably 0.1 to 20 parts by weight, and more preferably 0.5 to 10 parts by weight, per 100 parts by weight of the epoxy resin. Within this range, the storage stability of the composition of the present invention is further improved without deterioration of the curing property of the composition.

The composition of the present invention contains the ketimine compound as a latent curing agent. The ketimine compound includes aldimine other than ketimine. Ketimine used in the present invention is a compound which can be obtained by reacting a ketone with a polyamine. Aldimine is a compound which can be obtained by reacting an aldehyde with a polyamine.

Of those ketimine compounds, ketimine synthesized from ketone having a substituent at α-position and large steric hindrance, and an amine having methylene group at α-position and small steric hindrance is preferable for the composition of the present invention. Such ketimine has a bulky substituent near a double bond of ketimine group, and ketimine nitrogen is protected by this substituent. Therefore, its basicity is greatly weakened, and as a result, the curing rate and storage stability, which are opposite properties each other, can be established together.

The composition of the present invention containing such ketimine as a latent curing agent has particularly excellent storage stability and also has short curing time from being taken out of a vessel, coupled with the use of the epoxy resin wherein the content of the epoxy resin having hydroxyl groups in the molecule is less than 10 mol %.

Ketone having a substituent at α-position used in the present invention is a ketone having a substituent at α-position counted from carbonyl group, and examples thereof include methyl isobutyl ketone (MIBK), methyl ethyl ketone (MEK), methyl isopropyl ketone, methyl t-butyl ketone, diisopropyl ketone, and methyl isopropyl ketone. Further examples thereof include propiophenone and benzophenone. Of those, the compound represented by the above-described formula (3) is particularly preferable, and specific examples thereof include methyl isopropyl ketone and methyl t-butyl ketone. The composition comprising ketimine synthesized using those and the epoxy resin has excellent balance between the storage stability and the curing property, which is preferable.

The polyamine having at least two amino groups in the molecule, wherein α-position is methylene, used in the present invention is preferably the compound represented by the above-mentioned formula (4). Examples of the compound represented by the formula (4) include ethylene diamine, propylene diamine, butylene diamine, diethylene triamine, triethylene tetramine, tetraethylene pentamine, pentaethylene hexamine, hexamethylene diamine, trimethyl hexamethylene diamine, N-aminoethyl piperidine, 1,2-diaminopropane, iminobispropyl amine, methyliminobispropyl amine, a diamine having a polyether skeleton, represented by JEPHARMINE EDR148, a product of Sun Technochemical Co., an aliphatic polyamine such as MPMD, a product of du Pont Japan Co., isophorone diamine, 1,3-bisaminomethylcyclohexane, 1-cyclohexylamino-3-aminopropane, 3-aminomethyl-3,3,5-trimethyl-cyclohexylamine, a diamine having norbornane skeleton, represented by NBDA, a product of Mitsui Chemical Co., metaxylylene diamine, and a polyamideamine having amino group at the molecular terminals of polyamide.

Of those, 1,3-bisaminomethylcyclohexane, norbornane diamine, metaxylylene diamine and polyamideamine are particularly preferable in that the composition of the present invention containing ketimine synthesized using those has excellent storage stability and also particularly excellent curing property.

The ketimine compounds used in the present invention are obtained by appropriately combining the polyamine and the ketone. Of those, ketimine synthesized from the polyamine, and methylisopropyl ketone or methyl t-butyl ketone is particularly excellent in the curing rate and storage stability. Further, ketimine synthesized from the ketone and 1,3-bisaminomethyl cyclohexane, norbornane diamine, metaxylylene diamine or polyamideamine is also particularly excellent in balance between the curing rate and storage stability, and in particular is excellent in the curing property.

Examples of the polyamine include a compound obtained from JEPHARMINE EDR148 which is a diamine having a polyether skeleton, a product of Sun Technochemical Co., and methyl isopropyl ketone, a compound obtained by JEPHARMINE EDR 148 and methyl t-butyl ketone, a compound obtained from 1,3-bisaminomethyl cyclohexane and methyl t-butyl ketone, a compound obtained from NBDA, a product of Mitsui Chemical Co., and methyl isopropyl ketone, a compound obtained from 1,3-bisaminomethyl cyclohexane and methyl isopropyl ketone, a compound obtained from NBDA and methyl t-butyl ketone, a compound obtained from MXDA, a product of Mitsubishi Gas Chemical Co.,Inc., and methyl isopropyl ketone, a compound obtained from MXDA, a product of Mitsubishi Gas Chemical Co.,Inc., and methyl t-butyl ketone, a compound obtained from X2000, a product of Sanwa Kagaku Co., and methyl isopropyl ketone, and a compound obtained from X2000, a product of Sanwa Kagaku Co., and methyl t-butyl ketone.

Of those, the compound obtained from NBDA and methyl isopropyl ketone, the compound obtained from NBDA and methyl t-butyl ketone, and the compound obtained from 1,3-bisaminomethyl cyclohexane and methyl isopropyl ketone are particularly excellent in curing property.

Further, the compound obtained from X2000 and methyl isopropyl ketone and the compound obtained from X2000 and methyl t-butyl ketone are excellent in adhesiveness to a wet surface.

The ketimine compound obtained by reacting the ketone having a substituent at α-position with the polyamine having at least two amino groups in the molecule, α-position of the amino group being methylene, has a bulky group near the double bond of a ketimine group, and therefore satisfy the opposite characteristics of the curing rate and storage stability. Specifically, where the ketimine group-containing compound is synthesized using ketone which does not have a substituent at α-position of ketone carbon, such as methyl isobutyl ketone (MIBK) or methyl ethyl ketone (MEK), which is conventional general-purpose ketone in the art, ketimine nitrogen is exposed, therefore showing strong basicity. Therefore, a composition obtained by mixing such an ketimine compound with an epoxy resin has such a problem in the storage stability that gelation proceeds. However, the ketimine compound using methyl isopropyl ketone or methyl t-butyl ketone, having a substituent at α-position of ketone carbon is that the ketimine nitrogen is protected by the substituent, so that its basicity is greatly weakened due to steric hindrance. As a result, a composition obtained by mixing such a ketimine compound with an epoxy resin is maintained stably without receiving the influence of the ketimine compound.

On the other hand, if the epoxy resin composition using the above-described ketimine compound is exposed in air, small water molecule that is moisture easily attacks ketimine nitrogen without receiving steric hindrance of the substituent, and hydrolysis easily proceeds. Therefore, curing time of the epoxy resin composition is short.

The ketimine obtained by reacting the ketone having a substituent at α-position with the polyamine having at least two amino groups in the molecule, α-position of the amino group being methylene, is obtained by reacting the ketone and polyamine in the absence of a solvent, or in the presence of a solvent such as benzene, toluene or xylene, under heat refluxing while removing water eliminated by azeotropy.

The compounding amount of the ketimine compound (ketimine or aldimine) in the composition of the present invention is that (imino group in ketimine or aldimine)/(epoxy group in epoxy resin) is preferably 0.1 to 2.0, and more preferably 0.3 to 1.5, in equivalent ratio. Within this range, both storage stability and curing property are good.

The above-described compounding amount corresponds to 1.6 (mmol/g) or less, and preferably 0.2 to 1.5 (mmol/g), in terms of a concentration of ketimine group in the composition of the present invention.

The ketimine compound used in the present invention is silicon-containing compounds having a ketimine group, represented by formulae (9) and (10) in the specification of The International Patent Application PCT/JP98/00220 filed on Jan. 21, 1998 by the same applicant of the present invention, or silicone compounds having epoxy group, ketimine group and alkoxysilyl group in the same molecule. Compounds represented by formula (21) in the above-mentioned PCT specification as the specific examples can also be used as the ketimine compound used in the present invention.

The composition of the present invention comprising the epoxy resin, the ketimine compound and the alkoxysilyl group-containing compound is produced by mixing those three components under nitrogen atmosphere.

In addition to the above-described components, the composition of the present invention may contain curing accelerators, fillers, plasticizers, thixotropic agents, pigments, dyes, anti-aging agents, antioxidants, antistatic agents, flame retardants, tackifiers, dispersing agents, solvents and the like, within the range that the object of the present invention is not impaired.

Phosphites are very effective as the curing accelerator. The reason for this is that the phosphites do not adversely affect the composition, such as in increasing viscosity during storage of the epoxy resin composition.

Examples of the phosphites include triester compounds such as triphenyl phosphite, tris(nonylphenyl)phosphite, triethyl phosphite, tributyl phosphite, tris(2-ethylhexyl) phosphite, tridecyl phosphite, tris(tridecyl)phosphite, diphenylmono(2-ethylhexyl)phosphite, diphenylmonodecyl phosphite, diphenylmono(tridecyl)phosphite, tetraphenyldipropylene glycol diphosphite, tetraphenyltetra(tridecyl) pentaerythritol tetraphosphite, trilauryl trithiophosphite, bis(tridecyl)pentaerythritol diphosphite, bis(nonylphenyl) pentaerythritol diphosphite, tristearyl phosphite, distearyl pentaerythritol diphosphite, tris(2,4-di-t-butylphenyl) phosphite, or hydrogenated bisphenol A-pentaerythritol phosphite polymer. Further, diester compounds or monoester compounds obtained by partially hydrolyzing those triester compounds are also included in the examples of the phosphites. Of those, tetraphenyltetra(tridecyl) pentaerythritol tetraphosphite, bis(tridecyl)pentaerythritol diphosphite, bis(nonylphenyl)pentaerythritol diphosphite, distearylpentaerythritol diphosphite, and hydrogenated bisphenol A-pentaerythritol phosphite polymer have particularly high accelerating effect and are suitably used.

Of those phosphites, where the triester compound is used, the amount thereof added is 0.005 mol % or more, and preferably 0.005 to 1.0 mol %, per mole of the epoxy group in the epoxy resin. Further, where the diester compound or monoester compound, obtained by partially hydrolyzing the triester compound, is used, the amount thereof added is 0.005 to 50 mol %, and preferably 0.005 to 10 mol %, per mole of the epoxy group in the epoxy resin. If the amount thereof is less than 0.005 mol %, the compound does not have the effect as a curing accelerator, and on the other hand, if the amount of diester compound is 50 mol % or more, the storage stability of the composition deteriorates.

Further, the composition of the present invention may also contain an accelerator other than phosphites, as an accelerator.

The fillers which can be used in the present invention are organic fillers or inorganic fillers, having various shapes, and examples thereof include fumed silica, calcined silica, precipitated silica, crushed silica, molten silica, diatomaceous earth; iron oxide, zinc oxide, titanium oxide, barium oxide, magnesium oxide; calcium carbonate, magnesium carbonate, zinc carbonate, waxy clay (Roseki clay), kaolin clay, calcined clay, carbon black, or their fatty acids, resin acids or fatty acid ester-treated products.

The amount of the filler added is preferably 30 to 300 parts by weight, and more preferably 80 to 200 parts by weight, per 100 parts by weight of the epoxy resin, from the physical properties of the cured product obtained from the composition of the present invention after curing.

Also, examples of the plasticizer that can be used in the present invention include dioctyl phthalate (DOP), dibutyl phthalate (DBP), dioctyl adipate, isodecyl succinate, diethylene glycol dibenzoate, pentaerythritol ester, butyl oleate, methyl acetyl ricinoleate, tricresyl phosphate, trioctyl phosphate, propylene glycol adipate polyester, and butylene glycol adipate polyester. Those plasticizers may be used alone or as mixtures of two or more thereof.

Examples of the thixotropic agent which can be used in the present invention include AEROSIL (a product of Nippon Aerosil Co.) and DISPARON (a product of Kusumoto Kasei Co.).

Examples of the antistatic agent which can be used in the present invention generally include quaternary ammonium salts and hydrophilic compounds such as polyglycol or ethylene oxide derivatives.

The pigment which can be used in the present invention is inorganic pigments and organic pigments. Examples of the inorganic pigment include titanium dioxide, zinc oxide, iron blue, red oxide, lithopone, lead, cadmium, iron, cobalt, aluminum, hydrochloride and sulfate.

Examples of the organic pigment include azo pigment and copper phthalocyanine pigment.

Examples of the anti-aging agent which can be used in the present invention include hindered phenol compounds.

Examples of the antioxidant which can be used in the present invention include butyl hydroxytoluene (BHT) and butyl hydroxyanisole (BHA).

Examples of the flame retardant which can be used in the present invention include chloroalkyl phosphate, dimethylmethyl phosphate, phosphorus bromide compound, ammonium polyphosphate, neopentylbromide-polyether, and brominated polyether.

Examples of the tackifier that can be used in the present invention include terpene resin, phenolic resin, terpene-phenol resin, rosin resin and xylene resin.

The composition of the present invention contains the above-described ketimine compound as a latent curing agent, and may also contain other curing agents in an amount within the range that the object of the invention is not impaired. Examples of the other curing agent include aldimine compounds obtained by reacting aldehyde with amine, and oxazolidine ring-containing compounds.

The composition of the present invention may contain a compound having a silyl ester group represented by the following formula (8). By containing a specific amount of the compound having such a silyl ester group, the curing time can be shortened without deterioration of the storage stability of the composition of the present invention.

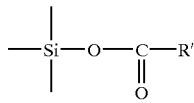

(8)

wherein R' represents hydrogen atom or a hydrocarbon group having 1 to 20 carbon atoms.

Examples of the hydrocarbon group include straight-chain hydrocarbon groups such as methyl group, ethyl group, vinyl group, propyl group, octyl group, lauryl group, palmityl group, stearyl group, allyl group or eicosyl group; branched hydrocarbon groups such as isopropyl group or isobutyl group; alicyclic hydrocarbon groups such as cyclohexamethyl group; and aromatic groups such as phenyl group or benzyl group.

The hydrocarbon groups having 1 to 17 carbon atoms are particularly preferable as R' for the reason that it is excellent in the storage stability of the composition and a promoting effect of the curing reaction. When R' is hydrogen atom, the storage stability is slightly poor, and when R' is the hydrocarbon groups having 18 or more of carbon atoms, the promoting effect of the curing reaction slightly lowers.

The compound having a silyl ester group, used in the present invention is not particularly limited. The silyl ester group may be contained in the main chain, at the terminals of the main chain or at the side chains. Further, one or more silyl ester group may be contained. Where at lest two silyl ester groups represented by the formula (8) are contained in the compound, only one silyl ester group may be contained and those silyl groups may be the same or different. The main chain of the compound having such silyl ester group mainly comprises Si-O bond. The main chain may be one kind or two kinds or more. Where the silyl ester group represented by the formula (8) is contained in the main chain, Si of the silyl ester group is Si in the main chain.

Specific example of the compound having such a silyl ester group can show compounds represented by the following formulae (9) to (11):

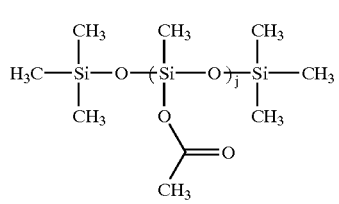

(9)

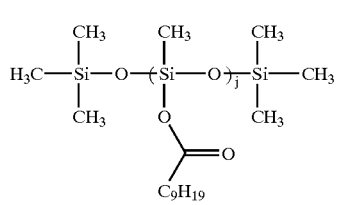

(10)

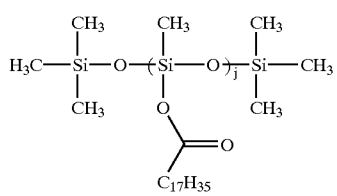

(11)

In the formulae (9) to (11) above, the number j of repeating units of the. silyl ester group is an integer of 1 to 100.

The compound having the silyl ester group is synthesized by dehydration condensing polyhydrogen siloxane having Si-H group such as poly(methylhydrogen)siloxane, and carboxylic acids such as straight-chain, saturated fatty acid (e.g., formic acid or stearic acid), unsaturated fatty acid (e.g., caproleic acid), aromatic carboxylic acid (e.g., benzoic acid), or alicyclic carboxylic acid (e.g., naphthoic acid); or a copolymer of the polyhydrogen siloxane and an alkene, and the carboxylic acids, using a transition metal of Group VIII in the Periodic Table, such as Pt or Ru, or a chloride of those metals, as a catalyst.

In the composition of the present invention, the content of the compound having silyl ester group is preferably 0.05 to 10 parts by weight per 100 parts by weight of the epoxy resin. Within this range, the curing time is shortened without deterioration of the storage stability. The content of 0.1 to 8.0 parts by weight is more preferable.

The composition of the present invention may contain calcium carbonate within the range that the object of the present invention is not impaired. In particular, by a surface-treated calcium carbonate, the viscosity can be adjusted, and also good initial thixotropic properties and storage stability can be obtained.

Conventional surface-treated calcium carbonate, treated with fatty acid, resin acid, urethan compound or fatty acid ester can be used as such calcium carbonate. Examples of calcium carbonate surface-treated with fatty acid, which is suitably used include CALFINE 200 (a product of Maruo Calcium Co., Ltd.), and WHITON 305 (heavy calcium carbonate, a product of Shiraishi Calcium Co.). Example of calcium carbonate surface-treated with fatty acid ester, which is suitably used is SEELET 200 (a product of Maruo Calcium Co., Ltd.).

In the case of a one-pack room temperature curable resin composition using a surface-treated calcium carbonate as calcium carbonate, when a compound represented by the following formula (12) or (13) is used as a ketimine, the thixotropic properties and storage stability are particularly excellent.

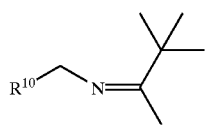

(12)

wherein $R^{10}$ represents an organic group having at least one of O, S, N and an aromatic ring.

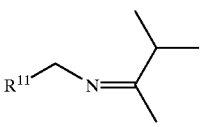

(13)

wherein $R^{11}$ represents an organic group (including an organic group containing O, S or N).

The surface-treated calcium carbonate has low surface polarity. Therefore, if a ketimine compound having low polarity is used, wetting occurs, and thixotropic properties lower. To prevent this wetting, it is preferable to use a ketimine compound having relatively high polarity.

In the ketimine represented by the formula (13) above, the substituents near the imino group is methyl group and isopropyl group, which are too small to decrease the polarity of imino group having high polarity. Therefore, good thixotropic properties and storage stability can be maintained without being influenced by a ketimine skeleton ($R^{11}$).

On the other hand, in the ketimine represented by the formula (12), the polarity of imino group is lower than that of methyl group and t-butyl group. Therefore, the ketimine skeleton ($R^{10}$) is made to have high polarity.

Examples of the ketimine having relatively high polarity include ketimines synthesized from diamine having polyether skeleton, represented by JEPHARMINE EDR148, a product of Sun Technochemical Co., or diamines having xylylene skeleton, represented by MXDA, a product of Mitsubishi Gas Chemical Co., Inc. and methyl isopropyl ketone or methyl t-butyl ketone; and ketimines synthesized from diamine having norbornane skeleton, represented by NBDA, a product of Mitsui Chemical Corp., or diamines having cyclohexane skeleton, represented by 1,3-BAC, a product of Mitsubishi Gas Chemical Co.,Inc., and methyl isopropyl ketone.

The amount of calcium carbonate added is preferably 30 to 300 parts by weight, and more preferably 80 to 200 parts by weight, per 100 parts by weight of the epoxy resin. If the amount thereof is less than 30 parts by weight, appropriate initial thixotropic properties and workability are not obtained, and on the other hand, if the amount exceeds 300 parts by weight, viscosity increases, resulting in poor workability.

The process for producing the composition of the present invention is not particularly limited. Preferable process is that each component is sufficiently kneaded, if necessary, together with other additives, using a stirring device such as mixing mixer, under reduced pressure, particularly in a reduced nitrogen atmosphere, to uniformly disperse each component, thereby obtaining an epoxy resin composition.

The on-pack epoxy resin composition of the present invention uses a ketimine compound having large steric hindrance as a latent curing agent. Therefore, curing rate can be made appropriate while maintaining good storage stability. Further, the one-pack epoxy resin composition of the present invention uses the epoxy resin having hydroxyl groups in the molecule in an amount of less than 10 mol % per mole of the total epoxy resins, and therefore, can markedly improve the storage stability without deterioration of curing property, as compared with a one-pack epoxy resin composition using the conventional ketimine compound as a latent curing agent.

When the composition of the present invention uses the epoxy resin having no isocyanate group, which is obtained by reacting hydroxyl groups existing in the epoxy resin with an isocyanate group-containing compound, preferably an isocyanate group-containing compound having at least one isocyanate group having large steric hindrance, to cap hydroxyl groups, the composition has good curing property and excellent storage stability. Further, the composition of the present invention using the epoxy resin wherein all hydroxyl groups therein are capped has further excellent storage stability.

When the one-pack epoxy resin composition of the present invention is prepared using the epoxy resin which is obtained by reacting all hydroxyl groups existing in the epoxy resin with a polyisocyanate compound, preferably a polyisocyanate compound having at least two isocyanate groups having large steric hindrance, to cap hydroxyl groups, the storage stability is particularly good, and the curing property is further excellent.

Further, the composition of the present invention using the epoxy resin having no hydroxyl group, obtained by reacting hydroxyl groups present in the epoxy resin with an alkoxysilyl group-containing compound also has good curing property and excellent storage stability.

Moreover, the composition of the present invention obtained by mixing the epoxy resin with the alkoxysilyl group-containing compound and the ketimine compound also has good curing property and excellent storage stability.

The composition of the present invention using the epoxy resin consisting of only the molecule that does not originally contain hydroxyl groups also has good curing property and excellent storage stability.

By taking the above-mentioned constitution, the one-pack epoxy resin composition of the present invention has excellent curing property and storage stability. In particular, the curing rate upon being taken out of a vessel is fast, and therefore, the composition of the present invention can suitably be used as an adhesive, a paint or a sealing agent of concrete, wood, metal and the like.

EXAMPLES

The present invention is described below in more detail with reference to the following examples, but it should be understood that the invention is not construed as being limited thereto.

Reference Example 1

Synthesis of Ketimine 100 g of a diamine having a norbornane skeleton (NBDA, a product of Mitsui Chemical Co.), 200 g of methyl isopropyl ketone and 200 g of toluene were charged in a flask, reaction was continued for 20 hours while removing water formed by azeotropy to obtain ketimine A represented by the following formula (14).

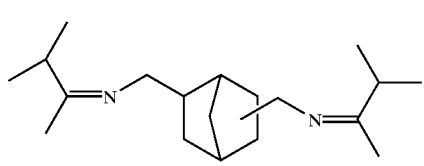

(14)

Examples 1 and 2, and Comparative Example 1

Epoxy resin A, B or C and ketimine A were compounded in the formulation as shown in Table 1 below to obtain a composition. The composition thus obtained was evaluated about the curing property (surface curing time), and the storage stability (viscosity increase). The results obtained are shown in Table 1 below.

TABLE 1

|  | Example 1 | Example 2 | Comparative Example 3 |
| --- | --- | --- | --- |
| Epoxy resin A | 100 |  |  |
| Epoxy resin B |  |  | 100 |
| Epoxy resin C |  | 100 |  |
| Ketimine A | 36 | 36 | 38 |
| Surface curing time (hr) | 15 | 15 | 15 |
| Viscosity increase (times) | 1.5 | 3 | 10 |

In Table 1, unit of the compound is parts by weight. Each component in Table 1:

Epoxy resin A: Epoxy resin having no hydroxyl group; DER 332 (a product of Dow Chemical Co.)

Epoxy resin B: Epoxy resin having a hydroxyl group content of 16 mol %; YD128 (a product of Toto Kasei Co.)

Epoxy resin C: Epoxy resin obtained by capping all hydroxyl groups present in the epoxy resin with a compound having an isocyanate group having large steric hindrance (TMI, a product of Mitsui Scitec Co.); modified 128 (a modified product of YD 128)

Evaluation Method

1) Surface Curing Time (Tack Free Time) (T.F.T)

Time that a polyethylene film does not adhere to a surface of a resin composition under conditions of 20° C. and a humidity of 55%.

2) Viscosity Increase

Value obtained by dividing a viscosity of a resin composition which was allowed to store at 70° C. for one day after standing by a viscosity at the time of standing one day at 20° C. after compounding.

Reference Example 2

Preparation of Epoxy Resin D (Modified 128A)

100 g of epoxy resin B (YD128) having hydroxyl groups, 10 g of the alkoxysilyl group-containing compound (MS 51) represented by the formula (7) and 0.2 g of tetraisopropoxytitanium (a product of Matsumoto Kosho Co.) as a condensation catalyst were reacted at 100° C. for 4 hours while removing methanol formed under reduced pressure to condense hydroxyl groups contained in the total epoxy resins with alkoxysilyl groups, thereby obtaining epoxy resin D.

Reference Example 3

Preparation of Epoxy Resin E (Modified 128B)

Epoxy resin E was obtained in the same manner as in the preparation of epoxy resin D except for using trimethoxyvinylsilane as the alkoxysilyl group-containing compound.

Example 3 to 5, and Comparative Example 1

Epoxy resin B, D or E, ketimine A and an alkoxysilyl group containing compound (MS51) were compounded in the formulation as shown in Table 2 below to obtain a composition.

In Example 5, reaction of epoxy resin B and the alkoxysilyl group-containing compound (MS51) was conducted during compounding other compound, in the presence of 1.0 g of tetraisopropoxytitanium to cap all hydroxyl groups in the total epoxy resins.

The compositions obtained were measured and evaluated about the curing property (surface curing time) and storage stability (viscosity increase) in the same manner as in Examples 1 and 2. The results obtained are shown in Table 2 below.

TABLE 2

|  | Example 3 | Example 4 | Example 5 | Comparative Example 1 |
|---|---|---|---|---|
| Epoxy resin B |  |  | 100 | 100 |
| Epoxy resin D | 100 |  |  |  |
| Epoxy resin E |  | 100 |  |  |
| MS51 |  |  | 5 |  |
| Ketimine A | 36 | 36 | 38 | 38 |
| Surface curing time (hr) | 15 | 15 | 15 | 15 |
| Viscosity increase (times) | 2.0 | 2.0 | 2.0 | 10 |

In Table 2, unit of the compound is parts by weight.
Component in Table 2:
MS51: Alkoxysilyl group-containing compound, a product of Mitsubishi Chemical Corp.

Reference Example 4
Production of Epoxy Resin F

Epoxy resin B (YD128) wherein 16 mol % of molecule had hydroxyl groups, and a polyisocyanate compound represented by the following formula (15) were mixed such that the ratio of the isocyanate group in the polyisocyanate compound to hydroxyl groups in the epoxy resin is NCO/OH=2.0 in equivalent ratio. The resulting mixture was reacted under heating at 80° C. in the presence of a tin catalyst and stirring to obtain epoxy resin F wherein total hydroxyl groups in the epoxy resins were reacted with the isocyanate compound to cap those.

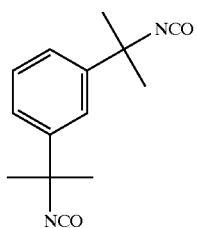

Reference Example 5
Production of Epoxy Resin G

Epoxy resin G was obtained in the same manner as in the production of epoxy resin F except that the compounding ratio of epoxy resin B (YD128) and the polyisocyanate compound of the formula (15) was NCO/OH=1.5. Epoxy resin G was an epoxy resin having no hydroxyl group.

Examples 6 and 7, and Comparative Example 2

Epoxy resin F or G and ketimine A were compounded in the formulation as shown in Table 3 below to obtain a resin composition. The resin compositions obtained were measured and evaluated about the curing property (surface curing time) and storage stability (viscosity increase). The results obtained are shown in Table 3 below.

TABLE 3

|  | Example 6 | Example 7 | Comparative Example 2 |
|---|---|---|---|
| Epoxy resin B |  |  | 100 |
| Epoxy resin F | 100 |  |  |
| Epoxy resin G |  | 100 |  |
| Ketimine A | 41 | 40 | 38 |
| Surface curing time (hr) | 9 | 11 | 17 |
| Viscosity increase (times) | 5.0 | 4.0 | 6.0 |

In Table 3, unit of the compound is parts by weight.

Examples 8 and 9, and Comparative Examples 3 and 4

Epoxy resin B, ketimine compound A or B, and an alkoxysilyl group-containing compound A or B were compounded in the formulation as shown in Table 4 below to obtain resin compositions. Those resin compositions obtained were evaluated in the same manner as above. The results obtained are shown in Table 4 below.

TABLE 4

|  | Example | | Comparative Example | |
|---|---|---|---|---|
|  | 8 | 9 | 3 | 4 |
| Epoxy resin B | 100 | 100 | 100 | 100 |
| Alkoxysilyl group-containing compound A | 5 |  |  |  |
| Alkoxysilyl group-containing compound B |  | 5 |  |  |
| Ketimine A | 38 | 38 | 38 |  |
| Ketimine group-containing compound B |  |  |  | 38 |
| Surface curing time (hr) | 10 | 10 | 10 | 72 |
| Viscosity increase (times) | 4.5 | 4.5 | 10 | 4.5 |

In Table 4, unit of the compound is parts by weight. Each component in Table 4:

Epoxy resin B: YD128 (a product of Sumitomo Chemical Co., Ltd.)

Alkoxysilyl group-containing compound A: MS51 (a product of Mitsubishi Chemical Corp.)

Alkoxysilyl group-containing compound B: Phenyl trimethoxysilane (a product of Shin-Etsu Chemical Co., Ltd.)

Ketimine group-containing compound B: EH235R (a product of Asahi Denka Co.)

What is claimed is:

1. A one-pack epoxy resin composition comprising: a ketimine compound; and (1) an epoxy resin consisting essentially of a bisphenol A polyglycidyl ether epoxy resin or a bisphenol F polyglycidyl ether epoxy resin, where in each the content of epoxy resin having no hydroxyl groups in the molecule is more than 95 mol %, or (2) an epoxy resin containing (a) a bisphenol A polyglycidyl ether epoxy resin or a bisphenol F polyglycidyl ether epoxy resin, where in each the content of epoxy resin having no hydroxyl groups in the molecule is more than 95 mol % and (b) an epoxy-resin having hydroxyl groups capped by a reaction of hydroxyl groups in the molecule with a capping compound to thus modify the hydroxyl groups, wherein the total amount of epoxy resins (a) and (b) is more than 95 mol % of the total epoxy resin (2); and wherein, each of epoxy resins (1) or (2), have a content of epoxy resin having hydroxyl groups in the molecule which is 0 to less than 5 mol % of the total epoxy resin (1) or (2).

2. The one-pack epoxy resin composition as claimed in claim 1, wherein the ketimine compound is a ketimine compound obtained by reacting a ketone having a substituent at an α-position with a polyamine having at least two amino groups in the molecule.

* * * * *

UNITED STATES PATENT AND TRADEMARK OFFICE
CERTIFICATE OF CORRECTION

PATENT NO.    : 6,476,160 B1
DATED         : November 5, 2002
INVENTOR(S)   : Hiroyuki Okuhira et al.

It is certified that error appears in the above-identified patent and that said Letters Patent is hereby corrected as shown below:

<u>Title page,</u>
Item [56], References Cited, FOREIGN PATENT DOCUMENTS,
"4-188634"should read -- 7-188634 --.
"60-60227" should read -- 10-60227 --.

<u>Column 22,</u>
Line 66, "epoxy-" should read -- epoxy --.

Signed and Sealed this

Eighth Day of April, 2003

JAMES E. ROGAN
*Director of the United States Patent and Trademark Office*